Aug. 22, 1933.  G. A. F. WINCKLER  1,923,561
ROTARY COMBUSTION ENGINE
Filed May 28, 1929   3 Sheets-Sheet 1

Inventor,
Gunnar A.F. Winckler,
by Frank G. Hattie
Attorney.

Aug. 22, 1933.  G. A. F. WINCKLER  1,923,561
ROTARY COMBUSTION ENGINE
Filed May 28, 1929  3 Sheets-Sheet 2
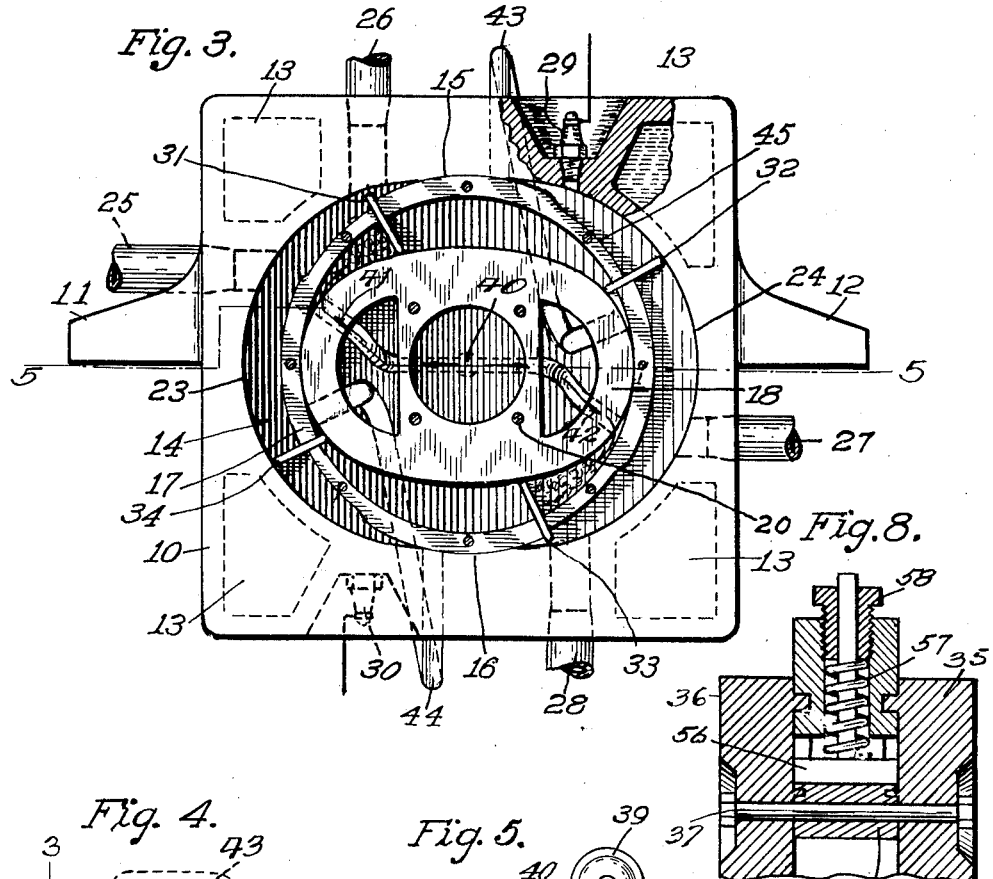
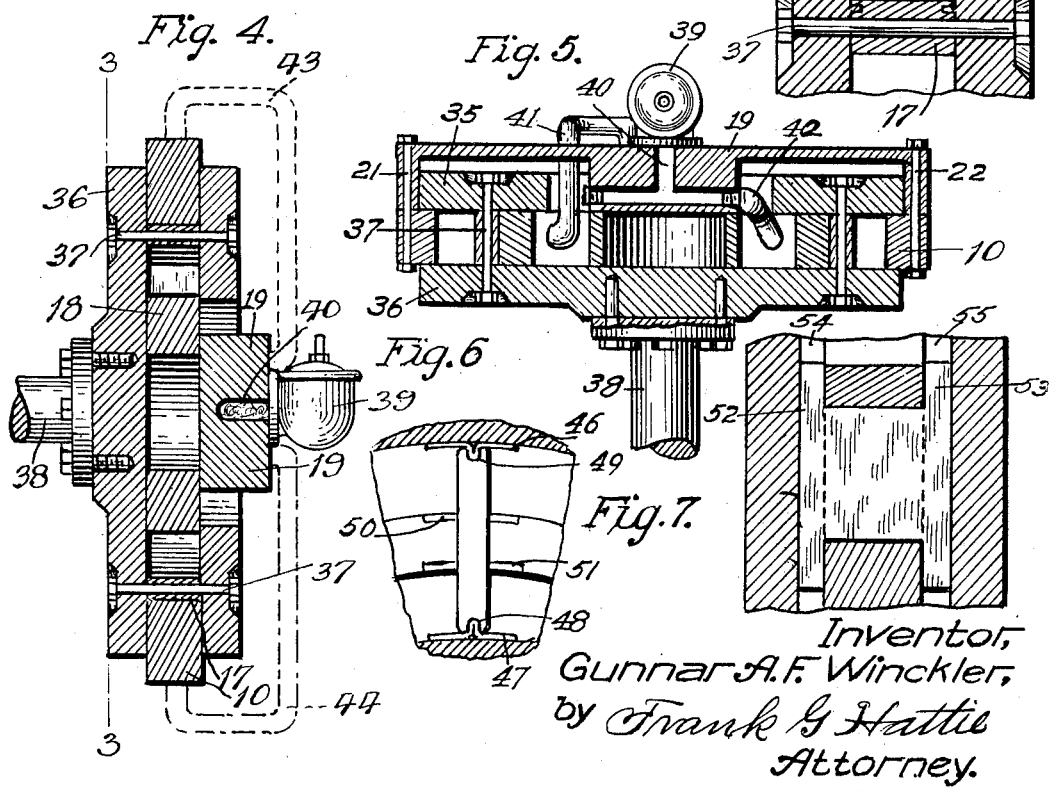
Inventor,
Gunnar A. F. Winckler,
by Frank G Hattie
Attorney.

Inventor,
Gunnar A.F. Winckler,
by Frank G Hattie
Attorney.

Patented Aug. 22, 1933

1,923,561

UNITED STATES PATENT OFFICE 1,923,561

ROTARY COMBUSTION ENGINE

Gunnar A. F. Winckler, Marblehead, Mass.

Application May 28, 1929. Serial No. 366,731

5 Claims. (Cl. 123—16)

The invention relates to expansion engines of the rotary type and consists of a rotary element enclosed in a suitable casing having chambers formed therein and located on both sides of the said rotary element in which compression and expansion takes place at a predetermined time.

The invention further consists of novel elements which will produce a maximum number of explosions for a uniform flow of power, and develops the greatest efficiency by applying the force of the explosion in a direction tangential to the motor element.

The object of the invention is to obtain a uniform flow of power, a pure explosive mixture through eliminating compression head and an application of the force of the explosion tangential to the motor element. A further object of the invention is to make a cheap, durable and self cleaning engine.

Referring to the figures. Figure 1 is a side elevation of my improved expansion engine with the carburetor and other auxiliary devices in position.

Figure 3 is a longitudinal section of my improved expansion engine showing the operation devices.

Figure 4 is a vertical cross section of the same.

Figure 5 is a horizontal section of the same.

Figure 6 is an enlarged view showing packing device for the rotor elements for insuring gas tight conditions while rotating.

Figure 7 is an enlarged view showing gas tight device for insuring gas tight conditions of blades under radial reciprocating movement.

Figure 8 is an enlarged view showing a carbon scraper.

Figure 1:
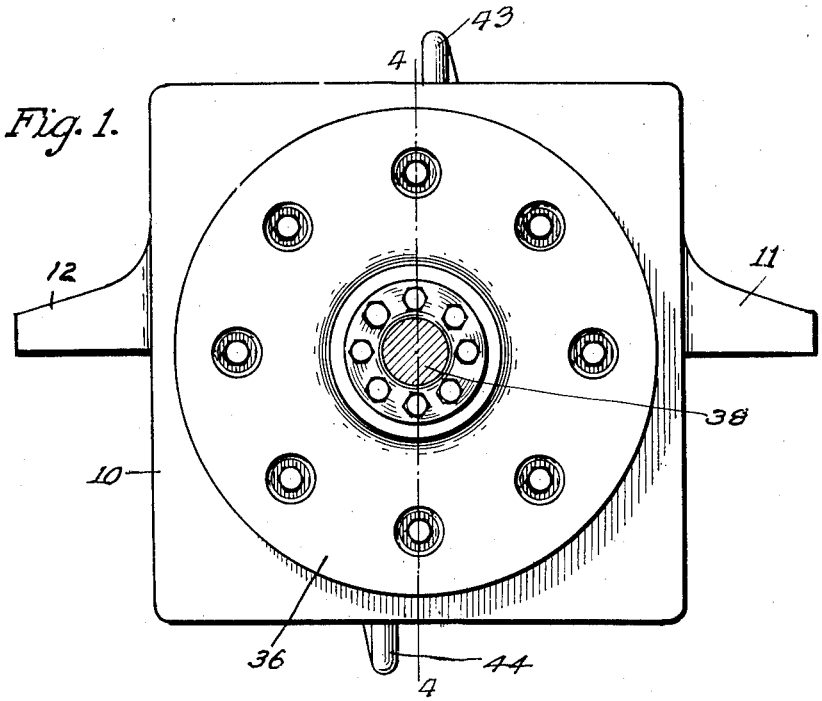
Figure 2:
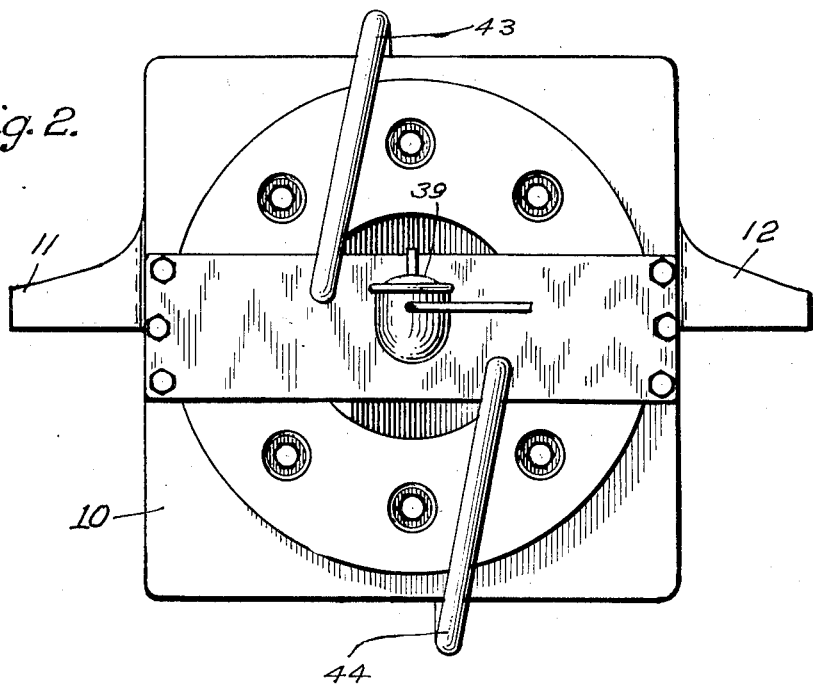
Figure 2 is an elevation of the opposite side of the engine showing attachments and driving shaft.

Referring to the drawings in detail. 10 indicates the casing of an improved rotary engine of the expansion type having suitable supporting lugs 11 and 12 formed integral with the frame.

Formed in the casing 10 are cooling chambers 13 connected to a cooling fluid supply in any suitable manner for maintaining a safe and desirable operating temperature.

Formed in the casing 10 is an operating chamber 14 approximately elliptical formation, having retaining depressions 15 and 16 of circular form adapted to receive an operating ring 17, which is the main rotor element of the motor device. The depressions 15 and 16 formed in the operating chamber 14 of the casing 10 are of sufficient depth to guide the ring 17 on its outer surface in its path of rotation. The inner surface of the ring 17 is held in position by a stationary elliptical cam block 18 held rigidly in position on the yoke 19 by means of the bolts 20. The ends of the yoke are secured to the casing 10 by the bolts 21 and 22. By this construction the operating ring 17 is held on its outer surface by the depressions 15 and 16 and on its inner surface by the elliptical cam block 18. These members are so arranged as to hold the ring 17 in an exact position while it is rotating.

Extending from the surfaces 15 and 16, formed in the casing 10, are arched chambers 23 and 24 forming fluid expansion chambers between the ring 17 and the casing 10. Connected to the casing 10 are the exhaust pipes 25, 26, 27 and 28, through which the waste gases flow. Threaded into the casing 10 are spark plugs 29 and 30 of any suitable type forming a part of the ignition system for firing the gases of propulsion.

Carried by the ring 14 are the propelling blades 31, 32, 33 and 34 for transmitting power caused by the expansion of the fluid held within the limits of the chambers 23 and 24. These blades have a reciprocating radial movement during the rotation of the ring 14 and the functions are determined by the contour of the chambers 23 and 24, depressions 15 and 16 and the elliptical cam block 18. It is obvious that if the blades in their path of travel through the arched chambers come in contact with the depressions 15 and 16, they will gradually be guided to the narrowing dimensions of the cam block and when the blades come to the wider dimensions of the cam block, they are again forced through the ring to the highest point in the arch, thus allowing varying operations to take place for the required operations of the machine.

The ring 17 shown in Figure 3 is made in 4 parts and rigidly secured to the rotating side plates 35 and 36 by the bolts 37. Rigidly secured to the side plate 35, by means of bolts, is a driving shaft 38. Secured to the yoke 19 is a carburetor 39 from which the fluid of propulsion is led to the intake passage 40. The intake passages are machined in the projection formed integral with the yoke 19 and extend in two directions which connect up with the intake pipes 41 and 42.

The fluid from the carburetor 39 and the intake pipes 41 is drawn into the chamber back of the blades 31 and 33 inside of the operating ring 17 and expanded. The expansion of the fluid causes the ring and blade to rotate and, in their path of travel, the fluid is compressed and transferred through the pipes 43 and 44 to the upper surface of the operating ring. At this point the gases are gradually admitted into the arched chambers 23 and 24. The fluid is permitted to be transferred from one side of the ring 17 to the opposite side by the depression 45 formed in the periphery of the said ring 17. When the depression 45 passes the transfer pipes 43 and 44 there is no communication to either side of the ring. When the fluids of compression are totally enclosed in the chamber above the ring in the vicinity of the spark plug, ignition takes place which fires and expands the gases and causes the engine to rotate. After the expansion of the gases, they are allowed to escape through the exhaust pipes 25, 26, 27 and 28.

Figures 6, 7 and 8 show the detailed refinements of the devices which are not shown in the main views as their delineation would be so small that they could not be disclosed and these enlargements are for the purpose of preventing confusion in reading the drawing.

Figure 6 shows packing springs 46 and 47 made of any suitable material, but preferably of hardened steel. The center is made of U-shaped construction and rests in the grooves 48 and 49 formed in the blades 31, thereby holding them in position.

As mentioned hereinbefore, the ring 17 is held on its outer periphery by the depressions 15 and 16 and on the inside by the outside surface of the cam block 18 and it is necessary at all times to keep obstructions from its path. To obviate this condition, with reference to the packing springs 46 and 47, depressions 50 and 51 are provided to allow the packing springs to become flush with the ring as they travel by the holding depressions 15 and 16. These packing springs insure an absolute tight fit between the blades and the inside casing contour and the outside contour of the cam block when the ring is rotating.

Figure 7 shows packing strips 52 and 53 formed integral with the blades 31, 32, 33 and 34, and run in the grooves 54 and 55, machined in the rotating side plates 35 and 36 to insure a gas tight condition on the side of the blades.

Figure 6 shows a scavenging device for removing both carbon and waste gases which may have collected on the periphery of the ring 17 and specifically in the depression 45, as carbon collecting on these members is not altogether detrimental to the device for, in fact, it aids lubrication. As the depression is necessary to the transfer of the fluid, this device is only an aid or a precaution to keep the depression clean or of constant area, or also to clean or scavenge the gases which would otherwise be carried over into the next chamber and slightly pollute the mixture. This device consists of a scraper 56 constantly held downwardly by a spring 57 which abuts against the scraper on one end and the adjusting screw 58 on the opposite end.

Figure 12:
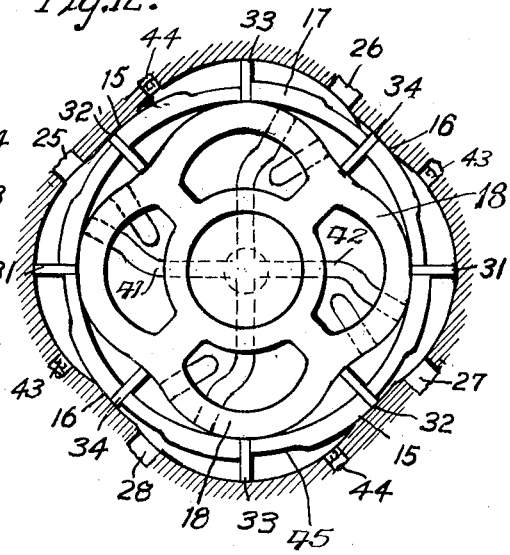
Figure 12 is a modified view showing the structure in relation to increasing the number of operations per revolution to insure a maximum smooth flow of power.

Figure 12 shows a modification of the device for increasing the number of explosions per revolution in order to obtain an absolute smooth flow of power and consists of an increased number of blades and arches cooperating with the ring, otherwise the structure is the same as shown in Figure 3.

Figure 13:
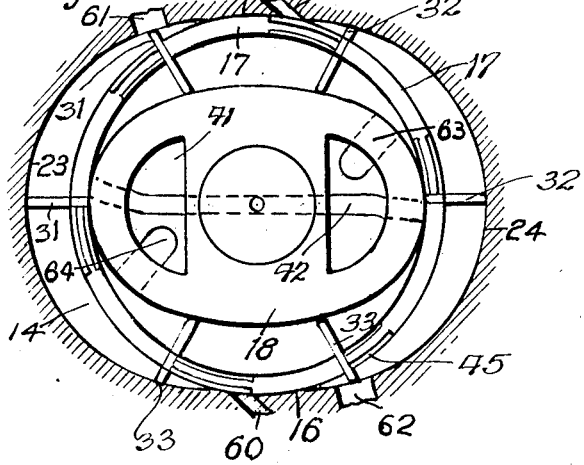
Figure 13 is a modified view showing the structure in relation to the use of expansion fluids such as steam, etc.

Figure 13 shows this new type of rotary engine for use with vapor pressures, with a fixed cut-off. The vapor or steam enters the nozzles 59, 60, and exhaust ports 61 and 62 with the addition of nozzles 63 and 64 formed on the under surface of the ring, which provides a maximum number of expansions per revolution, evenly distributed.

This is a non-reciprocating engine of the expansion type with the force applied tangentially to the wheel to obtain a larger leverage in a small space. This type of engine eliminates crank shafts, links and all costly parts known of expansion types of engines.

In operation my improved rotary expansion engine develops a maximum, uniform flow of power by arrangement of successive impulses with one revolution which approximately or totally eliminates the periods during which the present methods require the engine to be carried over by inertia, depending on the number of blades and arches being used.

Figure 9:
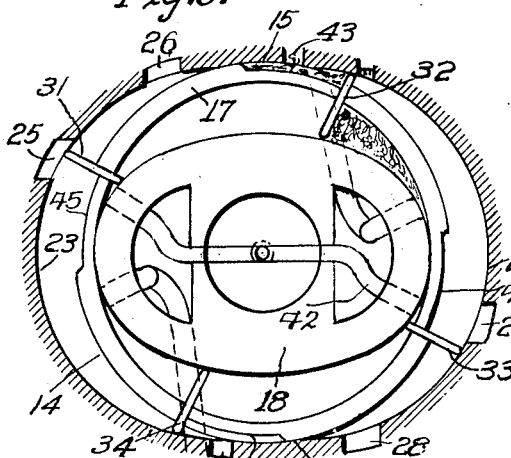
Figure 9 is a diagrammatic view showing the position of the gases during the operation of compression and transfer.
Figure 10:
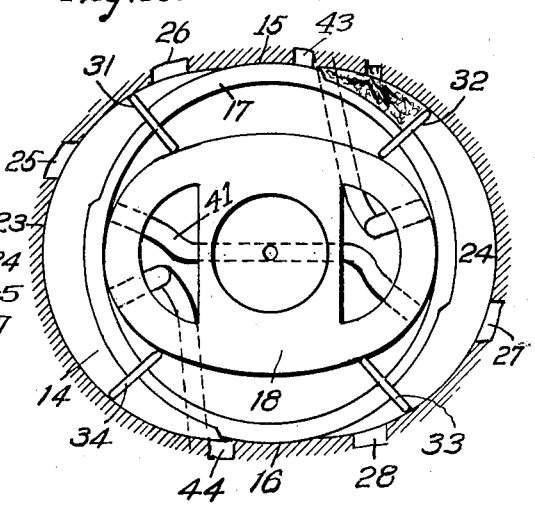
Figure 10 is a diagrammatic view showing the position of the gases during the firing operation.
Figure 11:
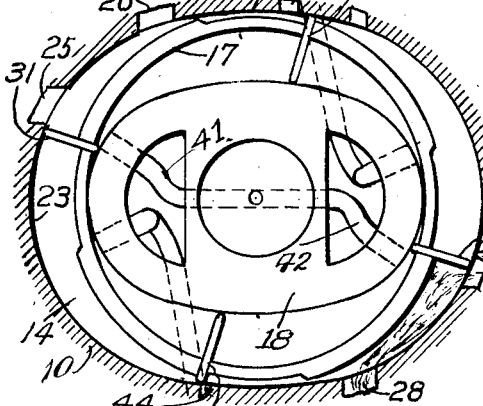
Figure 11 is a diagrammatic view showing the position of the gases during the exhaust operation.

The engine receives a fuel supply from a well known source not shown. In Figures 1 to 12 fuel enters the carburetor 39, passage 36 and pipes 40 and 41. The fuel passes to the back of the blades 31 and 32 between the inside surface of the ring 17 and the contour surface of the cam block 18. Figure 1 shows the suction operation filling the chamber with expansion fluid. The next blade in succession compresses the fluid as shown in Figure 9. This view shows the fluid being compressed and carried over from under the ring to the outer surface of the said ring 17 by the pipes 43 and 44.

The depression 45 in the ring 17 allows the compressed fluid to pass from one side of the ring to the opposite side of the ignition chamber when it is fired by the electrical spark plugs.

What I claim as new and desire to secure by Letters Patents of the United States is:

1. A rotary engine of the expansion type having a stationary supporting frame, spark plugs in the frame, a rotary motor element in the form of a ring supported in the frame, rotatable side walls secured to and rotates with the ring, a driving member secured to one of the side plates, a cam block inside the ring for supporting it at right angles to the frame support, a compression chamber in the casing located inside the ring, an outer expansion chamber located outside the ring, transfer pipe between the chambers, radial vanes moving in both the chambers and means in relation to the ring to compress and expand the fluids without auxiliary mechanism.

2. A rotary engine of the expansion type having a stationary supporting frame, spark plugs in the frame, a rotary motor element in the form of a ring supported in the frame, rotatable side walls secured to and rotates with the ring, a driving member secured to one of the side plates, a cam block inside the ring for supporting it at right angles to the frame support, a compression chamber in the casing located inside the ring, an outer expansion chamber located outside the ring, transfer pipe between the chambers, radial vanes moving in both the chambers, cam surfaces on the block inside the ring, cam surfaces forming the walls of the outer chamber to determine the position of the vanes on both sides of the ring as they rotate on their axis, depressions in mid position of the outer wall of the chamber for supporting the rotating ring, depressions in the outer surface of the ring to allow the fluid to pass between the vanes at a predetermined time.

3. A rotary engine of the expansion type having a stationary supporting frame, spark plugs in the frame, a rotary motor element in the form of a ring supported in the frame, rotatable side walls secured to and rotates with the ring, a driving member secured to one of the side plates, a cam block inside the ring for supporting it at right angles to the frame support, a compression chamber in the casing located inside the ring, an outer expansion chamber located outside the ring, transfer pipe between the chambers, radial vanes moving in both the chambers, cam surfaces on the block inside the ring, cam surfaces forming the walls of the outer chamber to determine the position of the vanes on both sides of the ring as they rotate on their axis, depressions in mid position of the outer chamber for supporting the rotating ring, depressions in the outer surface of the ring to allow the fluid to pass between the vanes at a predetermined time and means in relation to the ring to impart a plurality of impulses each revolution of the said ring.

4. A rotary engine of the expansion type having a stationary supporting frame, spark plugs in the frame, a rotary motor element in the form of a ring supported in the frame, rotatable side walls secured to and rotates with the ring, a driving member secured to one of the side plates, a cam block inside the ring for supporting it at right angles to the frame support, a compression chamber in the casing located inside the ring, an outer expansion chamber located outside the ring, transfer pipe between the chambers, radial vanes moving in both the chambers, cam surfaces on the block inside the ring, cam surfaces forming the walls of the outer chamber to determine the position of the vanes on both sides of the ring as they rotate on their axis, depressions in mid position of the outer chamber for supporting the rotating ring, depressions in the outer surface of the ring to allow the fluid to pass between the vanes at a predetermined time, radial vanes slidibly mounted in the rings and operated by the cam surfaces, a plurality of opposing spark plugs firing simultaneously to offset the thrust of explosion.

5. A rotary engine of the expansion type having a stationary supporting frame, spark plugs in the frame, a rotary motor element in the form of a ring supported in the frame, rotatable side walls secured to and rotates with the ring, a driving member secured to one of the side plates, a cam block inside the ring for supporting it at right angles to the frame support, a compression chamber in the casing located inside the ring, an outer expansion chamber located outside the ring, transfer pipe between the chambers, radial vanes moving in both the chambers, cam surfaces on the block inside the ring, cam surfaces forming the walls of the outer chamber to determine the position of the vanes on both sides of the ring as they rotate on their axis, depressions in mid position of the outer chamber for supporting the rotating ring, depressions in the outer surface of the ring to allow the fluid to pass between the vanes at a predetermined time, radial vanes slidibly mounted in the rings and operated by the cam surfaces, a plurality of opposing spark plugs firing simultaneously to offset the thrust of explosion, radial grooves in the rotating side plates in which the vanes slide for making them fluid tight.

GUNNAR A. F. WINCKLER.